(12) United States Patent
Kuang

(10) Patent No.: US 10,863,860 B2
(45) Date of Patent: Dec. 15, 2020

(54) BEVERAGE BREWING DEVICE AND BEVERAGE MACHINE HAVING SAME

(71) Applicants: GUANGDONG MIDEA CONSUMER ELECTRICS MANUFACTURING CO., LTD., Foshan (CN); MIDEA GROUP CO., LTD., Foshan (CN)

(72) Inventor: Jian Kuang, Foshan (CN)

(73) Assignees: GUANGDONG MIDEA CONSUMER ELECTRICS MANUFACTURING CO. LTD., Foshan (CN); MIDEA GROUP CO. LTD., Foshan (CN)

( * ) Notice: Subject to any disclaimer, the term of this patent is extended or adjusted under 35 U.S.C. 154(b) by 286 days.

(21) Appl. No.: 15/882,816

(22) Filed: Jan. 29, 2018

(65) Prior Publication Data

US 2018/0146819 A1 May 31, 2018

Related U.S. Application Data

(63) Continuation of application No. PCT/CN2015/088681, filed on Aug. 31, 2015.

(30) Foreign Application Priority Data

Jul. 27, 2015 (CN) .......................... 2015 1 0452596
Jul. 27, 2015 (CN) .......................... 2015 1 0452597

(Continued)

(51) Int. Cl.
*A47J 31/56* (2006.01)
*A47J 31/44* (2006.01)
(Continued)

(52) U.S. Cl.
CPC ........... *A47J 31/56* (2013.01); *A47J 31/3695* (2013.01); *A47J 31/407* (2013.01); *A47J 31/4403* (2013.01)

(58) Field of Classification Search
CPC .... A47J 31/4403; A47J 31/56; A47J 31/3695; A47J 31/407; A47J 31/31; A47J 31/34;
(Continued)

(56) References Cited

U.S. PATENT DOCUMENTS 5,251,541 A * 10/1993 Anson ................. A47J 31/4403
99/280
6,708,600 B2 * 3/2004 Winkler .............. A47J 31/3695
99/295

(Continued)

FOREIGN PATENT DOCUMENTS

CN 203762899 * 8/2014 ............. A47J 31/18
CN 203762899 U 8/2014
(Continued)

OTHER PUBLICATIONS

Midea, International Search Report and Written Opinion, PCT/CN2015088681, dated May 4, 2016, 11 pgs.

*Primary Examiner* — Tu B Hoang
*Assistant Examiner* — Diallo I Duniver
(74) *Attorney, Agent, or Firm* — Morgan, Lewis & Bockius LLP

(57) ABSTRACT

Provided are a beverage brewing apparatus and a beverage machine having the beverage brewing apparatus. The beverage brewing apparatus comprises a barrel body for containing a beverage capsule and a cover body fitted with the barrel body. An inner bottom end of the barrel body and the cover body are respectively provided with a piercing needle for piercing the beverage capsule. When the cover body is closed, the piercing needle at the inner bottom end of the barrel body and the piercing needle on the cover body are disposed along different lines and the beverage capsule is pierced. The central part of the piercing needle on the cover body is hollow and forms a water inlet. The piercing needle (Continued)

on the cover body is sealed to the beverage capsule by virtue of a sealing unit. A beverage outlet is provided at a bottom end of the barrel body.

15 Claims, 5 Drawing Sheets

(30) Foreign Application Priority Data

Jul. 27, 2015 (CN) .................... 2015 2 0553370 U
Jul. 27, 2015 (CN) .................... 2015 2 0553416 U

(51) Int. Cl.
  *A47J 31/36* (2006.01)
  *A47J 31/40* (2006.01)
(58) Field of Classification Search
  CPC .......... A47J 31/36; A47J 31/44; A47J 31/545;
    A47J 31/469; A47J 31/3633; A47J
    31/0642; A47J 31/3628; A47J 31/3676;
    A47J 31/0673; A47J 31/3623; A47J
    31/0668; A47J 31/46; A47J 31/369; Y10T
    137/0396
  USPC .......... 99/283, 279, 295, 299, 300, 305, 323
  See application file for complete search history.

(56) References Cited

U.S. PATENT DOCUMENTS

| 2010/0028495 | A1* | 2/2010 | Novak | A47J 31/0668 |
| | | | | 426/77 |
| 2010/0107889 | A1* | 5/2010 | Denisart | A47J 31/3695 |
| | | | | 99/295 |
| 2012/0180669 | A1 | 7/2012 | Lovalvo et al. | |
| 2012/0276264 | A1* | 11/2012 | Rivera | A47J 31/0689 |
| | | | | 426/433 |
| 2014/0272016 | A1* | 9/2014 | Nowak | B65D 85/8043 |
| | | | | 426/112 |
| 2014/0299000 | A1* | 10/2014 | Hanneson | A47J 31/3633 |
| | | | | 99/300 |
| 2015/0201790 | A1* | 7/2015 | Smith | A47J 31/0673 |
| | | | | 426/431 |

FOREIGN PATENT DOCUMENTS

| CN | 203828713 U | 9/2014 |
| CN | 204410563 U | 6/2015 |
| EP | 2468151 A1 | 6/2012 |
| EP | 2732738 A1 | 5/2014 |

* cited by examiner

BEVERAGE BREWING DEVICE AND BEVERAGE MACHINE HAVING SAME

PRIORITY CLAIM AND RELATED APPLICATION

This application is a continuation application of PCT/CN2015/088681, entitled "BEVERAGE BREWING DEVICE AND BEVERAGE MACHINE HAVING SAME" filed on Aug. 31, 2015, which claims priority to (i) Chinese Patent Application No. 201510452597.8, filed with the State Intellectual Property Office of the People's Republic of China on Jul. 27, 2015, (ii) Chinese Patent Application No. 201510452596.3, filed with the State Intellectual Property Office of the People's Republic of China on Jul. 27, 2015, (iii) Chinese Patent Application No. 201520553370.8, filed with the State Intellectual Property Office of the People's Republic of China on Jul. 27, 2015, and (iv) Chinese Patent Application No. 201520553416.6, filed with the State Intellectual Property Office of the People's Republic of China on Jul. 27, 2015, all of which are incorporated herein by reference in their entirety.

TECHNICAL FIELD

The present disclosure relates to a technical field of beverage heating and brewing, and more particularly to a beverage brewing device and beverage machine having the same.

BACKGROUND

Nowadays consumers are more and more acceptant of making a drink with a beverage capsule. The main reasons are as follows: first, the beverage capsule is easy to operate and convenient to use; second, the beverage capsule can be directly thrown away when finished, which omits the trouble of cleaning. A market of a beverage machine for making beverages such as coffee, milk tea or tea is becoming increasingly bigger along with growing demands, and the beverage machine mainly includes a beverage brewing device and a beverage machine body. In a beverage brewing process, a beverage capsule such as a coffee capsule with roasted coffee is put into a capsule-like cavity of the beverage brewing device, and then through a matched beverage machine body, a cup of espresso coffee can be easily extracted, such that coffee products in various flavors can be concocted.

However, the conventional beverage brewing devices are complex in structure, high in cost and non-detachably fixed to the beverage machine body; in addition, an internal structure of the beverage brewing device is not easy to clean.

SUMMARY

Embodiments of the present disclosure seek to solve at least one of the problems existing in the related art to at least some extent. For that reason, the present disclosure provides a beverage brewing device, which has a simple structure and is easy to clean.

The present disclosure further provides a beverage machine having the beverage brewing device.

The beverage brewing device according to embodiments of a first aspect of the present disclosure includes: a barrel body for containing a beverage capsule, an inner bottom end of the barrel body being provided with a beverage outlet; and a cover body fitted with the barrel body, the inner bottom end of the barrel body and the cover body each being separately provided with a piercing needle for piercing the beverage capsule, in which when the cover body is closed, the piercing needle at the inner bottom end of the barrel body and the piercing needle on the cover body are arranged along different straight lines, and pierce the beverage capsule, a central section of the piercing needle on the cover body is hollow and forms a water inlet, and the piercing needle on the cover body is seal-fitted with the beverage capsule through a sealing unit.

In addition, the beverage brewing device according to the present disclosure further has the following additional technical features.

According to some embodiments of the present disclosure, the sealing unit is a sealing ring, the sealing ring being fitted over the piercing needle on the cover body and being arranged coaxially with the piercing needle.

According to some embodiments of the present disclosure, the cover body is in hinged connection to the barrel body.

According to some embodiments of the present disclosure, the piercing needle on the cover body extends to an upper surface of the cover body and forms a connector connected to a beverage machine body.

According to some embodiments of the present disclosure, the cover body is provided with the connector communicated with the water inlet and connected to the beverage machine body.

According to some embodiments of the present disclosure, the connector is integrally formed with the cover body.

According to some embodiments of the present disclosure, an annular flange is provided at a position of the barrel body adjacent to an opening, a vertical baffle is optionally provided to an upper surface of the annular flange, and the vertical baffle is located at a periphery of the cover body.

The technical solutions of the beverage brewing device provided by the present disclosure have the following advantages: the beverage brewing device of the present disclosure can separate from the beverage machine body, and has a simple structure and is easy to remove; in addition, the piercing needle on the cover body is seal-fitted with the beverage capsule through the sealing ring, such that during brewage of the beverage, it is possible to ensure cleanness in a cavity of the beverage brewing device, and only the beverage outlet needs to be cleaned.

In some embodiments of the present disclosure, the cover body is in hinged connection to the barrel body, such that the cover body can rotate with respect to the barrel body, and when the cover body is closed, the piercing needles can pierce upper and lower ends of the capsule.

The beverage machine according to embodiments of a second aspect of the present disclosure includes the beverage brewing device of the present disclosure and the beverage machine body connected to the beverage brewing device.

In addition, the beverage machine according to the present disclosure further has the following additional technical features:

According to some embodiments of the present disclosure, the beverage machine body includes a main body; a machine nose mounted to an upper portion of the main body and configured to fix the beverage brewing device and convey water to the beverage brewing device; and a heating container and a water pump, in which the heating container and the water pump are fixedly mounted in the main body, the heating container is communicated with the atmosphere, and the water pump is located below the heating container and conveys the water in the heating container to the machine nose.

According to some embodiments of the present disclosure, a piercing needle on a cover body extends to an upper surface of the cover body and is connected to the machine nose, thereby allowing water to enter a water inlet from the machine nose.

According to some embodiments of the present disclosure, the machine nose includes a supporting rail, the beverage brewing device being able to move along the supporting rail and be fixed; and a machine nose shell connected to the supporting rail and disposed above the supporting rail, in which a pipeline is provided in the machine nose shell, the pipeline is in pipe connection to the water pump, and when the beverage brewing device is fixed, the pipeline is communicated with the water inlet of the beverage brewing device.

According to some embodiments of the present disclosure, an annular flange is provided at a position of a barrel body adjacent to an opening, and the barrel body is fixed to the supporting rail through the annular flange.

According to some embodiments of the present disclosure, the heating container is a boiler, the boiler is heated by a heating tray disposed on a bottom surface, and temperature of the water in the boiler is measured by a temperature sensor; the temperature sensor is connected to a controller, and the controller controls the water pump to operate according to a temperature parameter of the temperature sensor.

According to some embodiments of the present disclosure, the heating tray is connected to a temperature controller and a fuse, and the bottom surface of the boiler is a recessed surface.

According to some embodiments of the present disclosure, the main body includes a waste water box located below the machine nose; a housing, the heating container and the water pump being located in the housing, and the machine nose being mounted to the housing; a base, the waste water box and the housing being fixedly mounted to the base; and a fixing ring and a top cap, the top cap being connected to the housing through the fixing ring, and the top cap being configured to close the heating container.

The technical solutions of the beverage machine of the present disclosure have the following beneficial effects: in the beverage machine of the present disclosure, the water pump is provided below the heating container, and the machine nose is mounted to the upper portion of the main body, thereby simplifying the structure of the beverage machine, and allowing the beverage machine to be easy to carry.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

In order to describe embodiments of the present disclosure or technical solutions in the prior art more clearly, the drawings necessary in the descriptions of the embodiments or the prior art will be briefly explained. Obviously, the drawings in the following description are just some embodiments of the present disclosure. To those skilled in the art, in the premise of no creative labor, other drawings can also be obtained according to structures illustrated in these drawings.

Figure 1:
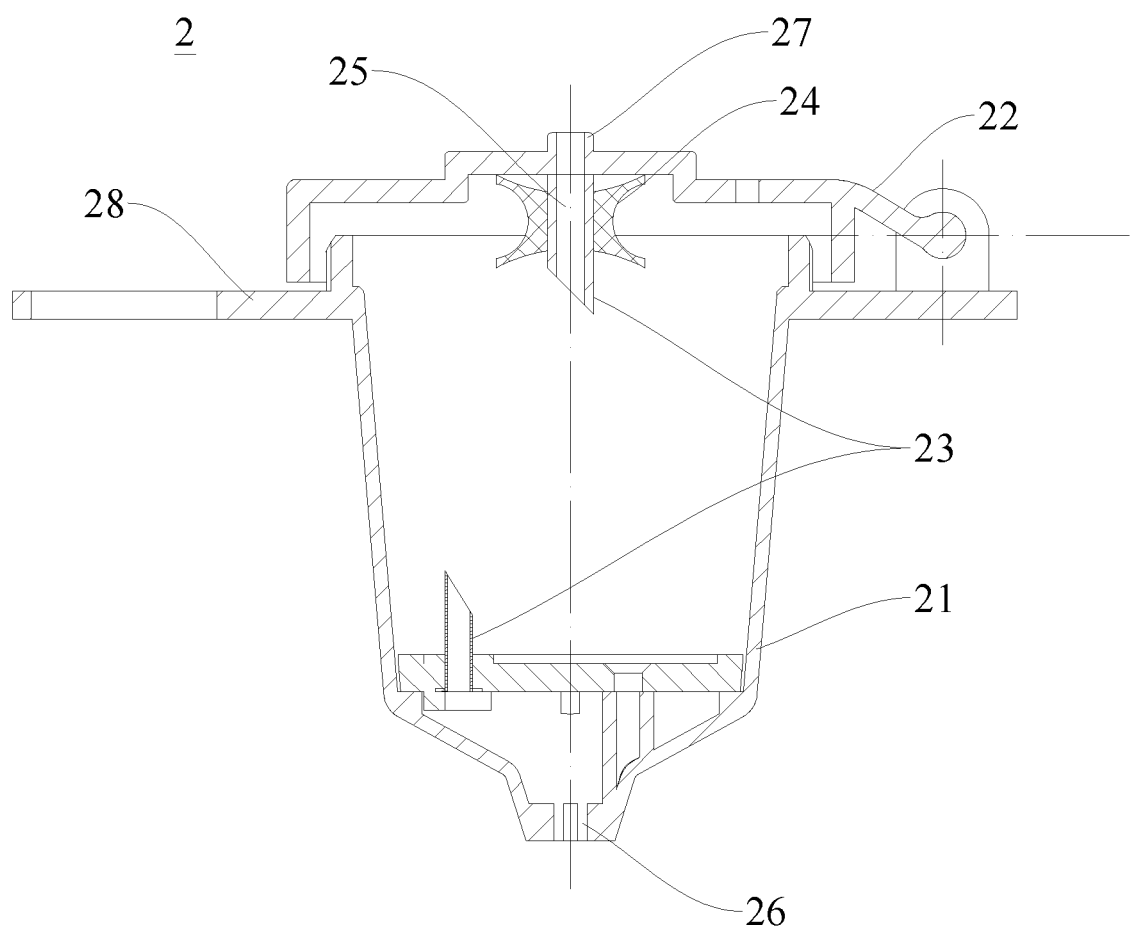
FIG. 1 is a section view of a beverage brewing device according to embodiments of the present disclosure when a cover body is closed.

In the drawings:
- 100 beverage machine;
- 1 beverage machine body;
- 11 main body; 111 waste water box; 112 base; 113 housing; 114 fixing ring; 115 top cap;
- 12 machine nose; 121 supporting rail; 122 machine nose shell;
- 13 boiler; 14 heating tray; 15 water pump; 16 temperature sensor;
- 2 beverage brewing device;
- 21 barrel body; 22 cover body; 23 piercing needle; 24 sealing ring; 25 water inlet; 26 beverage outlet; 27 connector; 28 annular flange; and 29 vertical baffle.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A beverage brewing device 2 according to embodiments of the present disclosure will be described firstly in the following with reference to FIGS. 1-3.

Figure 2:
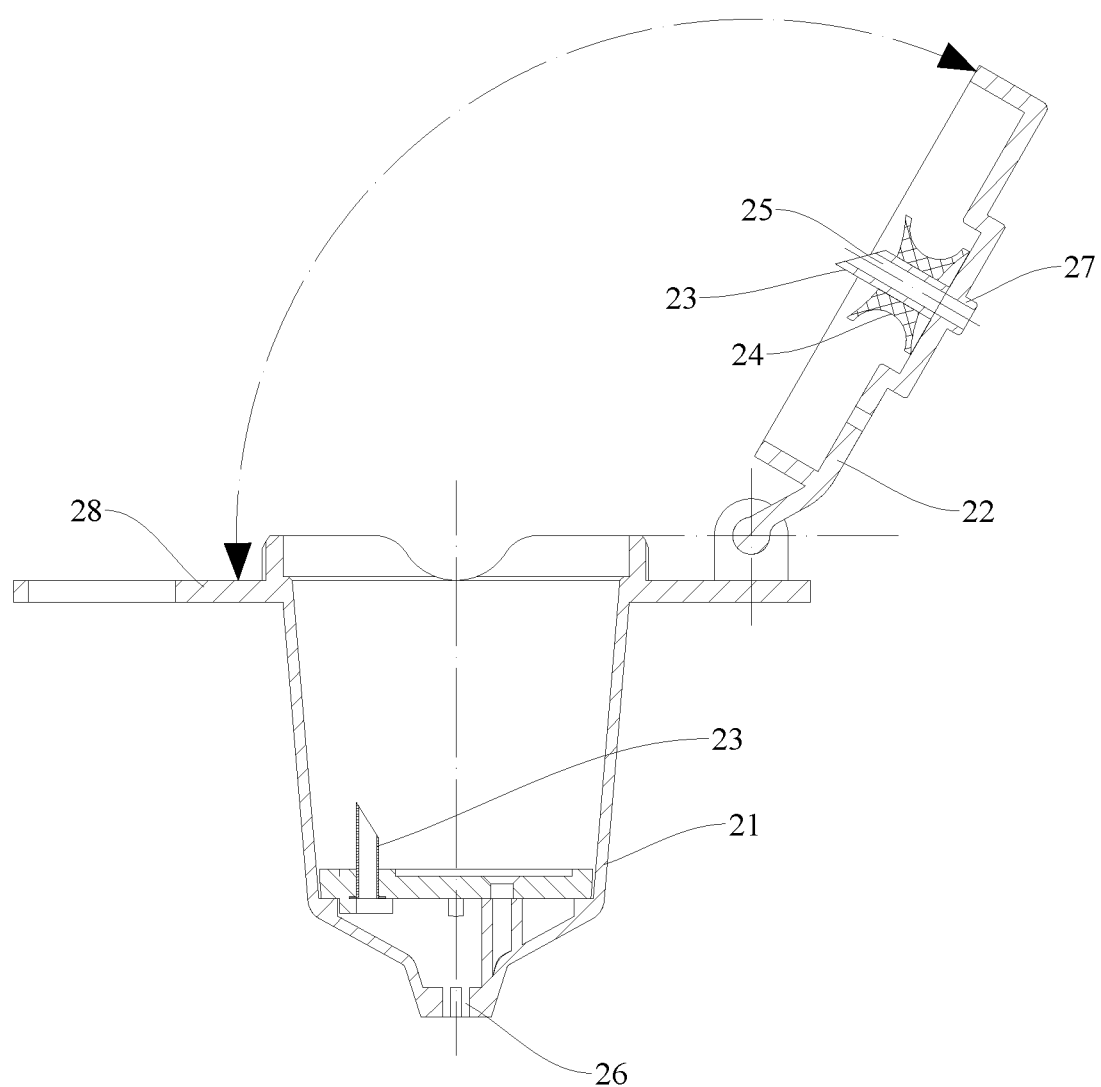
FIG. 2 is a section view of a beverage brewing device according to embodiments of the present disclosure when a cover body is opened.
Figure 3:
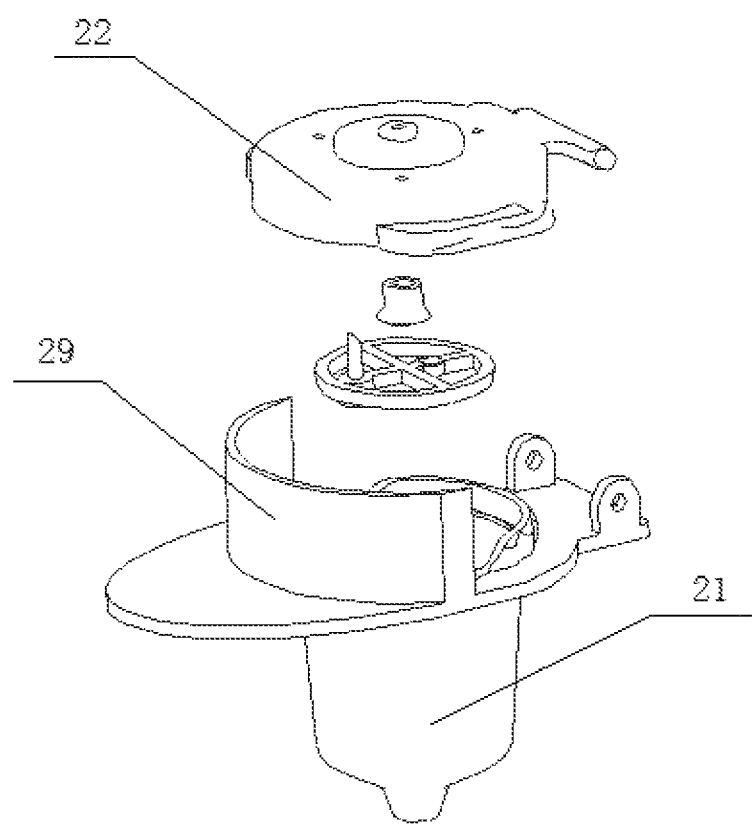
FIG. 3 is a perspective assembly view of a beverage brewing device according to embodiments of the present disclosure.

Referring to FIGS. 1-3, the beverage brewing device 2 includes a barrel body 21 for containing a beverage capsule, and a cover body 22 fitted with the barrel body 21. In this case, the cover body 22 is optionally in hinged connection to the barrel body 21, such that the cover body 22 can rotate with respect to the barrel body 21. In order to pierce the beverage capsule during brewage of the beverage, in the present embodiment, an inner bottom end of the barrel body 21 and the cover body 22 are separately provided with a piercing needle 23 for piercing the beverage capsule. When the cover body 21 is closed, referring to FIG. 1, the piercing needles 23 pierce an upper end and a lower end of the capsule, thereby facilitating the subsequent brewage of the beverage.

Preferably, when the cover body 22 is closed, referring to FIG. 1, the piercing needle 23 at the inner bottom end of the barrel body 21 and the piercing needle 23 on the cover body 22 are arranged along different straight lines, and pierce the upper and lower ends of the beverage capsule. The piercing needle 23 at the inner bottom end of the barrel body 21 (the piercing needle 23 located below) and the piercing needle 23 on the cover body 22 (the piercing needle 23 located above) are arranged along the different straight lines in an axial direction, such that when liquids enter from a water inlet 25 of the piercing needle 23 on the cover body 22, the liquids can be intensively mixed with a beverage ingredient in the beverage capsule.

Further, in the beverage brewing device 2, a central section of the piercing needle 23 on the cover body 22 is hollow and forms the water inlet 25. During the brewage of the beverage, the piercing needle 23 firstly pierces the capsule; the beverage machine 100 conveys water and allows hot water to be injected into the capsule in the beverage brewing device 2 from the water inlet 25 of the piercing needle 23; and finally the beverage flows out from a beverage outlet 26 at the bottom end of the barrel body 21.

It should be noted that, the water inlet 25 is disposed in the piercing needle 23, such that the hot water can directly enter the capsule instead of an inner cavity of the beverage brewing device 2, and hence after the beverage production is completed, it is only necessary to clean the beverage outlet 26 rather than the inner cavity of the beverage brewing device 2.

On that basis, the piercing needle 23 on the cover body 22 is seal-fitted with the beverage capsule through a sealing unit, thereby further preventing the beverage from entering the inner cavity of the beverage brewing device 2 from a top pierced hole. In this case, a sealing ring 24 is optionally adopted, which is fitted over the piercing needle 23 on the cover body 22 and is arranged coaxially with the piercing needle 23. Certainly, apart from the sealing ring 24, other common sealing structures can also be adopted in the present embodiment.

In addition, for convenience of connection to a machine nose 12 of a beverage machine body 1, the cover body 22 of the beverage brewing device 2 in the present embodiment is provided with a connector 27 connected to the beverage machine body 1. The connector 27 is fluidly connected to the piercing needle 23 on the cover body 22, and allows the water to enter the water inlet 25 through the connector 27. In this case, the connector 27 is integrally formed with the cover body 22, thereby simplifying the manufacturing process.

It is worth mentioning that the connector 27 connected to the beverage machine body 1 can also be formed and obtained by extending the piercing needle 23 to an upper surface of the cover body 22, in which case the beverage brewing device 2 has a simple structure and is easy to manufacture as well. If the connector 27 is integrally formed with the cover body 22, i.e., the piercing needle 23 is integrally formed with the cover body, the manufacturing process can be simplified to a greater extent. Certainly, regardless of a relationship between the piercing needle 23 and the connector 27, the piercing needle 23 can be integrally formed with the cover body 22, or the piercing needle 23 and the cover body 22 are fixedly connected after being formed separately.

In some embodiments, the connector 27 in the present embodiment further needs to satisfy the conveyance of water while satisfying the requirement for connection between the beverage brewing device 2 and the beverage machine body 1, and hence the connector 27 is a structure having the hollow central section. Certainly, the connection between the beverage brewing device 2 and the beverage machine body 1 is not limited to listed conditions in the present embodiment, and any connections which satisfy the objective of beverage brewage should be included in the present application.

For convenience of assembly of the beverage machine 100 and in order to satisfy a force bearing requirement of the beverage brewing device 2 better, optionally, an annular flange 28 is provided at a position of the barrel body 21 adjacent to an opening. In addition, in order to prevent contamination of the machine body due to a connection failure between the beverage brewing device 2 and the beverage machine body 1, a vertical baffle 29 may be provided to an upper surface of the annular flange 28. Further referring to FIG. 3, the vertical baffle 29 is located at a periphery of the cover body 22, thereby intercepting the overflowing liquids.

The beverage brewing device 2 in the present embodiment can separate from the beverage machine body 1, and has a simple structure and is easy to remove.

Figure 4:
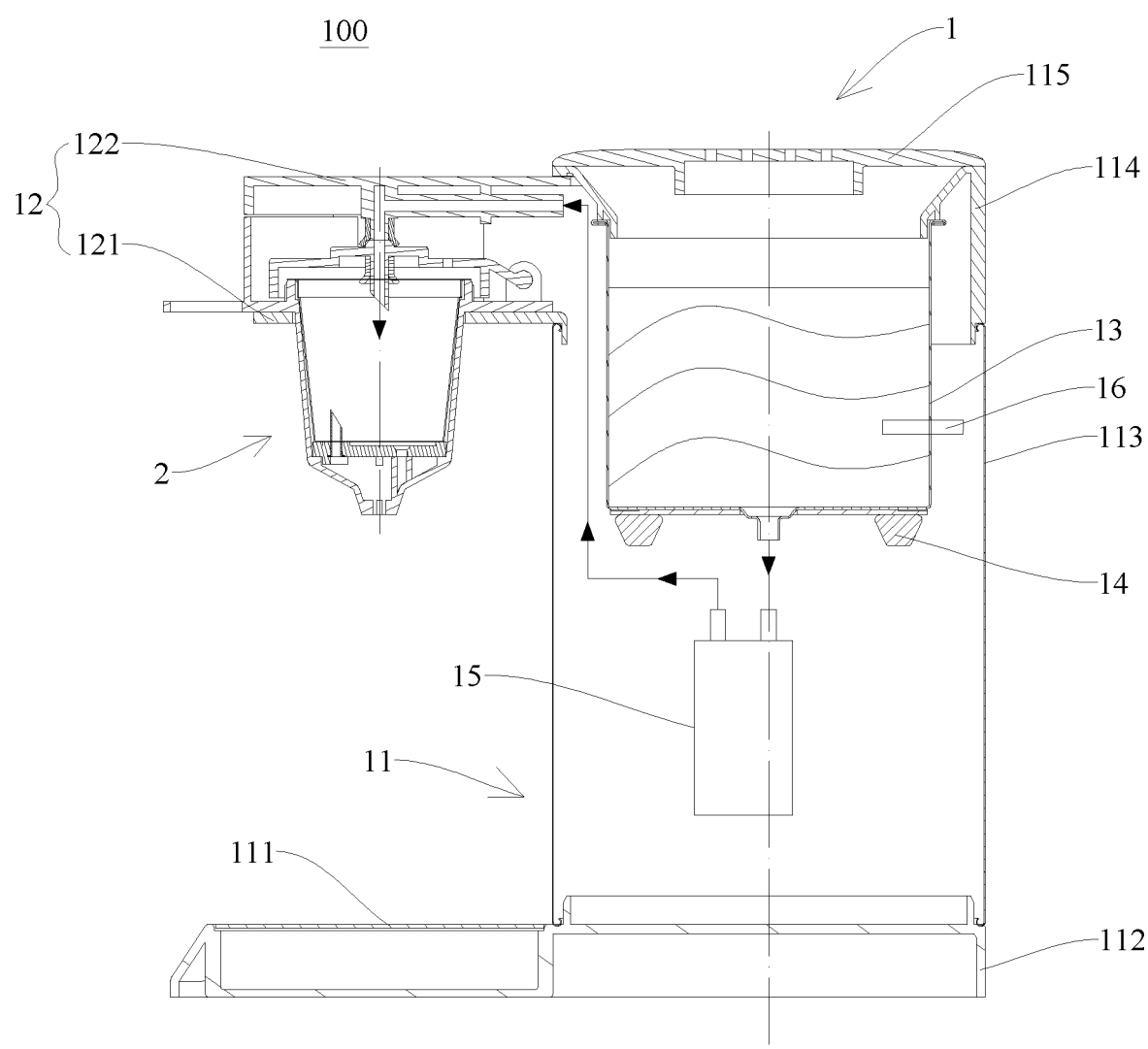
FIG. 4 is a schematic view of a beverage machine in a use state according to embodiments of the present disclosure.
Figure 5:
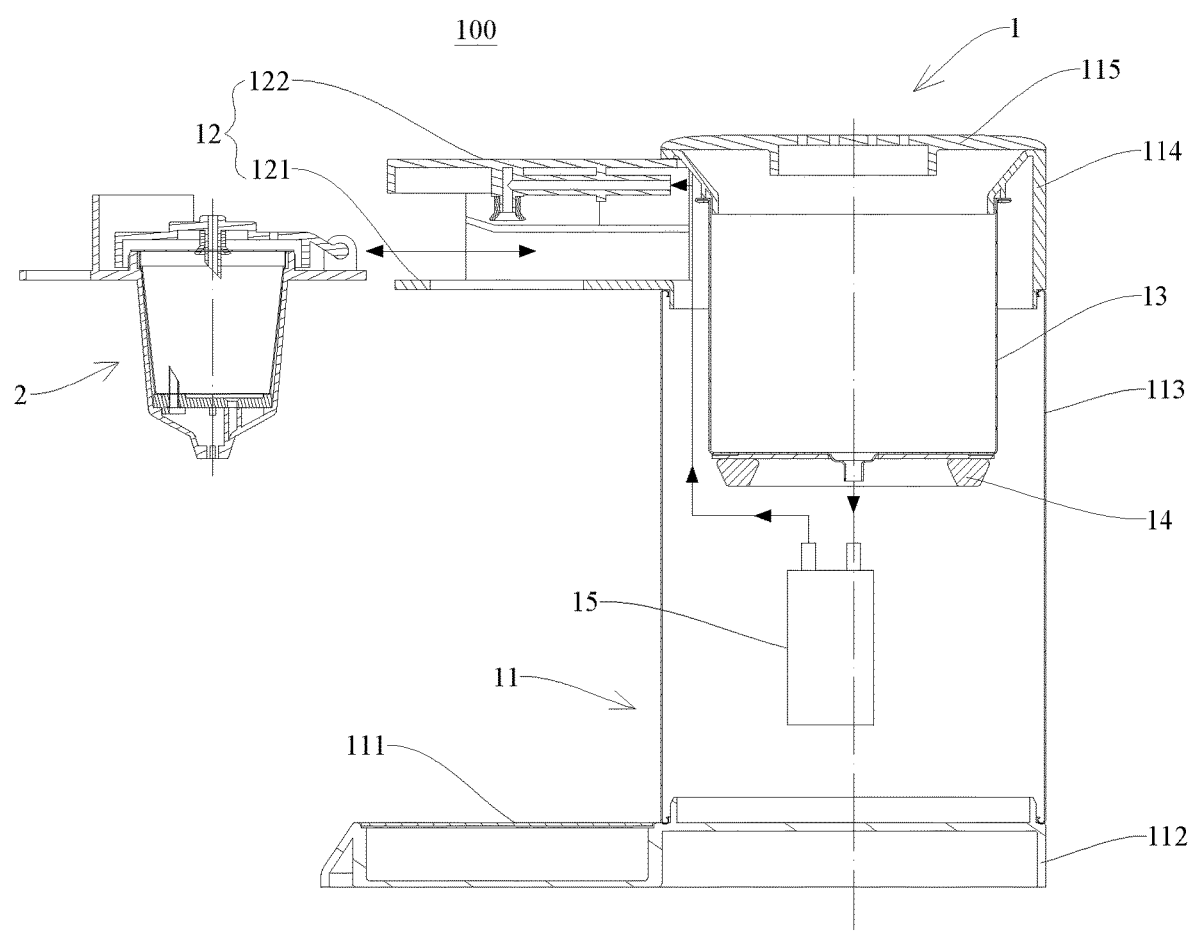
FIG. 5 is a schematic installation view of a beverage machine according to embodiments of the present disclosure in installation.

The present disclosure also provides the beverage machine 100, which includes the above-mentioned beverage brewing device 2 and the beverage machine body 1 connected to the beverage brewing device 2, with reference to FIGS. 4 and 5.

The beverage machine body 1 includes a main body 11, the machine nose 12, a heating container 17 and a water pump 15; the heating container 17 and the water pump 15 are fixedly mounted in the main body 11; the heating container 17 is communicated with the atmosphere, the water pump 15 is located below the heating container 17 and conveys the water in the heating container 17 to the machine nose 12; the machine nose 12 is mounted to an upper portion of the main body 11. In some embodiments, the machine nose 12 is mounted to an outside of the main body 11, and is optionally directly connected to an outer wall of the main body 11. Certainly, the machine nose 12 can also be connected to an inner wall or other positions of the main body 11, as long as functional requirements of the machine nose 12 can be satisfied finally. The machine nose 12 is configured to fix the beverage brewing device 2 and convey the water to the beverage brewing device 2. Specifically, the machine nose 12 is provided with a positioning-mounting structure, and the beverage brewing device 2 of the present embodiment is detachably mounted to the positioning-mounting structure.

In the present embodiment, the water pump 15 is provided below the heating container 17, and the machine nose 12 is mounted to an upper portion of the outer wall of the main body 11, thereby simplifying the structure of the beverage machine 100, and allowing the beverage machine 100 to be easy to carry. In addition, the beverage brewing device 2 is supplied with water through the water pump 15, so the heating container 17 does not need to be sealed, thereby avoiding a safety hazard existing in a heating process for a sealed container.

Further, during the brewage of the beverage, and in the beverage machine 100, the heating container 17 conveys the hot water to the machine nose 12, and the hot water is injected into the capsule of the beverage brewing device 2 from the water inlet 25 in the piercing needle 23 through the machine nose 12, and flows out from the beverage outlet 26 at the bottom end of the barrel body 21 finally.

In addition, the connector 27 provided to the cover body 22 of the beverage brewing device 2 in the present embodiment is connected to the machine nose 12. It is worth mentioning that, the connector 27 connected to the machine nose 12 can also be formed and obtained by extending the piercing needle 23 to the upper surface of the cover body 22, in which case the piercing needle 23 is connected to the machine nose 12, and the water is allowed to enter the water inlet 25 from the connector 27. Certainly, the connection between the beverage brewing device 2 and the machine nose 12 of the beverage machine 100 is not limited to listed conditions in the present embodiment, and any connections which satisfy the objective of beverage brewage should be included in the present application.

Based on the structure of the above-mentioned beverage brewing device 2, the machine nose 12 of the beverage machine 100 in the present embodiment includes a supporting rail 121 and a machine nose shell 122 which are connected to each other. The supporting rail 121 is configured to mount the beverage brewing device 2, such that the beverage brewing device 2 can move along the supporting rail 121 and be fixed. Moreover, a pipeline is provided in the machine nose shell 122, the pipeline is in pipe connection to the water pump 15, and when the beverage brewing device 2 is fixed, the pipeline is communicated with the water inlet 25 of the beverage brewing device 2. Obviously, in order to make the water in the pipeline of the machine nose shell 122 flow into the beverage brewing device 2, the machine nose shell 122 should be disposed above the supporting rail.

For convenience of fixation of a brewing chamber, the barrel body 21 is fixed to the supporting rail 121 through the annular flange 28. In addition, in order to prevent the contamination of the machine body due to a connection failure between the brewing chamber and the beverage machine body 1, the vertical baffle is optionally provided to the upper surface of the annular flange 28. Further referring to FIG. 3, the vertical baffle is located at the periphery of the cover body 22, thereby intercepting the overflowing liquids.

A connecting plate connected to the vertical baffle is provided to the machine nose shell 122, thereby preventing the contamination while improving the appearance, with reference to FIG. 4.

In the present embodiment, the heating container 17 is optionally a boiler 13, and the boiler 13 includes a boiler body 131 and a boiler cover 132. Obviously, since the boiler 13 needs to be communicated with the atmosphere, the boiler cover 132 does not serve to seal, but shield the boiler body 131. The boiler 13 is heated by a heating tray 14 disposed on a bottom surface, and temperature of the water in the boiler 13 is measured by a temperature sensor 16. The temperature sensor 16 transmits a measurement signal to a controller, and the controller controls the water pump 15 to operate according to a temperature parameter of the temperature sensor 16. For example, when the water in the boiler 13 is heated to a predetermined temperature, the controller controls the water pump 15 to operate, thereby conveying the hot water to the beverage brewing device 2. Certainly, positions of the heating tray 14 and the temperature sensor 16 are not specifically limited, as long as the heating tray 14 and the temperature sensor 16 can achieve the objectives of heating and temperature measurement respectively. Moreover, in this case, the heating tray 14 can also be replaced by other structures which can achieve the objective of heating.

The heating tray 14 is connected to a temperature controller and a fuse, and the temperature controller and the fuse are optionally disposed at a bottom surface of the heating tray 14, so as to ensure safety protection.

In order to make it convenient to drain the water in the boiler 3, the bottom surface of the boiler 13 is optionally designed as a recessed surface.

During the brewage of the beverage, the water which is heated to the predetermined temperature is conveyed to the beverage brewing device 2. When the water in the boiler 13 is drained, the water pump 15 continues to operate for a period of time. In this case, the water pump 15 conveys air to the beverage brewing device 2 and can just blow-dry the water in the capsule, thereby avoiding the residual liquid from contaminating the environment. Obviously, the position of the water pump 15 is set reasonably, such that the water pump 15 cannot only draw water, but also produce air pressure, thereby serve to brew the beverage and blow-dry the capsule.

Based on a brewing system of the beverage machine 100 composed of the above beverage brewing device 2 and the beverage machine body 1, the main body 11 of the present embodiment includes a waste water box 111, a base 112, a housing 113, a fixing ring 114 and a top cap 115, with reference to FIG. 4.

The waste water box 111 is located below the machine nose 12, so as to make it convenient for collection of waste water. The boiler 13 and the water pump 15 are fixedly mounted in the housing 113, and the machine nose 12 is mounted to the housing 113, thereby allowing an internal layout of the housing 113 to be compact. Likewise, from the point of the compact structure, a circuit board of the beverage machine 100 can be fixed below the boiler 13 in the housing 113. In addition, the top cap 115 is connected to the housing 113 through the fixing ring 114, and the top cap 115 is disposed above the boiler 13, thereby playing a role of dust prevention and shield for the boiler 13. It should be noted that, since the boiler 13 needs to be communicated with the atmosphere, the top cap 115 does not seal the boiler 13. The waste water box 111 and the housing 113 are fixedly mounted to the base 112, and further referring to FIG. 4, the waste water box 111 is fixed to an upper left side of the base 112, while the housing 113 is fixed to an upper right side of the base 112. Materials of the housing 113 can be plastic, metal or other, thereby satisfying diversification of the production.

The beverage brewing device 2 and the beverage machine 100 in the present embodiment can be applied in the brewage of beverages such as coffee, milk tea or tea.

Reference throughout this specification to "an embodiment," "some embodiments," "one embodiment", "another example," "an example," "a specific example," or "some examples," means that a particular feature, structure, material, or characteristic described in connection to the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A beverage brewing device, comprising:
    a barrel body for containing a beverage capsule, an inner bottom end of the barrel body being provided with a beverage outlet; and
    a cover body pivotally coupled to the barrel body at a hinge connection, the inner bottom end of the barrel body and the cover body each being separately provided with a piercing needle for piercing the beverage capsule, wherein the piercing needle on the cover body forms a connector configured to be connected to a beverage machine body, and wherein when the cover body is closed, the piercing needle at the inner bottom end of the barrel body and the piercing needle on the cover body are arranged along different straight lines, and pierce the beverage capsule, a central section of the piercing needle on the cover body is hollow and forms a water inlet, and the piercing needle on the cover body is seal-fitted with the beverage capsule through a sealing unit, wherein an annular flange is provided at a position adjacent to and around a periphery of an opening of the barrel body for the insertion or removal of the beverage capsule and extends radially from the opening, and a vertical baffle is provided on an upper surface of the annular flange, and located opposite the hinge connection to the annual flange and positioned outside the periphery of the opening to allow the cover body to open and close, and wherein the piercing needle on the cover body includes a slanted piercing surface facing toward the vertical baffle when the cover body is closed.

2. The beverage brewing device according to claim 1, wherein the sealing unit is a sealing ring, the sealing ring being fitted over the piercing needle on the cover body and being arranged coaxially with the piercing needle.

3. The beverage brewing device according to claim 1, wherein the piercing needle on the cover body extends to an upper surface of the cover body.

4. The beverage brewing device according to claim 1, wherein the connector is communicated with the water inlet.

5. The beverage brewing device according to claim 1, wherein the connector is integrally formed with the cover body.

6. A beverage machine comprising a beverage brewing device and a beverage machine body connected to the beverage brewing device, wherein the beverage brewing device further comprises:
    a barrel body for containing a beverage capsule, an inner bottom end of the barrel body being provided with a beverage outlet; and
    a cover body pivotally coupled to the barrel body at a hinge connection, the inner bottom end of the barrel body and the cover body each being separately provided with a piercing needle for piercing the beverage capsule, wherein the piercing needle on the cover body forms a connector configured to be connected to the beverage machine body, and wherein when the cover body is closed, the piercing needle at the inner bottom end of the barrel body and the piercing needle on the cover body are arranged along different straight lines, and pierce the beverage capsule, a central section of the piercing needle on the cover body is hollow and forms a water inlet, and the piercing needle on the cover body is seal-fitted with the beverage capsule through a sealing unit, wherein an annular flange is provided at a position adjacent to and around a periphery of an opening of the barrel body for the insertion or removal of the beverage capsule and extends radially from the opening, and a vertical baffle is provided on an upper surface of the annular flange, and located opposite the hinge connection to the annual flange and positioned outside the periphery of the opening to allow the cover body to open and close, and wherein the piercing needle on the cover body includes a slanted piercing surface facing toward the vertical baffle when the cover body is closed.

7. The beverage machine according to claim 6, wherein the beverage machine body further comprises:
    a main body;
    a machine nose mounted to an upper portion of the main body and configured to fix the beverage brewing device and convey water to the beverage brewing device; and
    a heating container and a water pump, wherein the heating container and the water pump are fixedly mounted in the main body, the heating container is communicated with the atmosphere, and the water pump is located below the heating container and conveys the water in the heating container to the machine nose.

8. The beverage machine according to claim 7, wherein a piercing needle on a cover body extends to an upper surface of the cover body and is connected to the machine nose, thereby allowing water to enter a water inlet from the machine nose.

9. The beverage machine according to claim 7, wherein the machine nose further comprises:
    a supporting rail, the beverage brewing device being able to move along the supporting rail and be fixed; and
    a machine nose shell connected to the supporting rail and disposed above the supporting rail, wherein a pipeline is provided in the machine nose shell, the pipeline is in pipe connection to the water pump, and when the beverage brewing device is fixed, the pipeline is communicated with the water inlet of the beverage brewing device.

10. The beverage machine according to claim 9, wherein the barrel body is fixed to the supporting rail through the annular flange.

11. The beverage machine according to claim 7, wherein the heating container is a boiler, the boiler is heated by a heating tray disposed on a bottom surface, and temperature of the water in the boiler is measured by a temperature sensor; the temperature sensor is connected to a controller, and the controller controls the water pump to operate according to a temperature parameter of the temperature sensor.

12. The beverage machine according to claim 11, wherein the heating tray is connected to a temperature controller and a fuse, and the bottom surface of the boiler is a recessed surface.

13. The beverage machine according to claim 7, wherein the main body further comprises:

a waste water box located below the machine nose;
a housing, the heating container and the water pump being located in the housing, and the machine nose being mounted to the housing;
a base, the waste water box and the housing being fixedly mounted to the base; and
a fixing ring and a top cap, the top cap being connected to the housing through the fixing ring, and the top cap being configured to close the heating container.

14. The beverage brewing device according to claim 1, wherein the piercing needle at the inner bottom end of the barrel body includes a piercing surface facing toward the piercing surface of the piercing needle on the cover body when the cover body is closed.

15. The beverage machine according to claim 6, wherein the piercing needle at the inner bottom end of the barrel body includes a piercing surface facing toward the piercing surface of the piercing needle on the cover body when the cover body is closed.

* * * * *